(12) United States Patent
Nishimura et al.

(10) Patent No.: US 8,335,142 B2
(45) Date of Patent: Dec. 18, 2012

(54) OPTICAL DISC DRIVE AND METHOD OF CONTROLLING LASER LIGHT POWER IN OPTICAL DISC DRIVE

(75) Inventors: Hajime Nishimura, Tokyo (JP); Shuichi Minamiguchi, Tokyo (JP); Hiroharu Sakai, Tokyo (JP); Kazuhiko Ono, Yohohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/177,713

(22) Filed: Jul. 7, 2011

(65) Prior Publication Data

US 2012/0008477 A1 Jan. 12, 2012

(30) Foreign Application Priority Data

Jul. 8, 2010 (JP) ................................. 2010-155862

(51) Int. Cl.
*G11B 11/00* (2006.01)
(52) U.S. Cl. ..................................... 369/53.26; 369/116
(58) Field of Classification Search ........................ None
See application file for complete search history.

(56) References Cited

U.S. PATENT DOCUMENTS

| 5,067,122 | A | * | 11/1991 | McGee | 369/116 |
| 5,537,383 | A | * | 7/1996 | Gage et al. | 369/116 |
| 2006/0274632 | A1 | * | 12/2006 | Yoshioka | 369/116 |
| 2008/0253260 | A1 | * | 10/2008 | Sonoyama et al. | 369/112.01 |

FOREIGN PATENT DOCUMENTS

JP 2004-146050 5/2004

* cited by examiner

*Primary Examiner* — Paul Huber
(74) *Attorney, Agent, or Firm* — Antonelli, Terry, Stout & Kraus, LLP.

(57) ABSTRACT

This invention provides an optical disc drive with more accurate and stable power control for a laser light source. An optical disc drive in an embodiment of this invention includes a monitor photodetector for receiving laser light emitted by a laser light source to monitor the laser light power. The monitor diode is a photodetector for generating an electric signal corresponding to the laser light power. A laser light controller controls drive current to the laser light source based on a result of measurement by the monitor diode. The optical disc drive measures output variations of the monitor diode and controls the gain of the monitor diode based on the result of the measurement. This gain control improves accuracy and stability in laser light control so that stability in recording/reading can be attained.

14 Claims, 6 Drawing Sheets

OPTICAL DISC DRIVE AND METHOD OF CONTROLLING LASER LIGHT POWER IN OPTICAL DISC DRIVE

CLAIM OF PRIORITY

The present application claims priority from Japanese patent application JP 2010-155862 filed on Jul. 8, 2010, the content of which is hereby incorporated by reference into this application.

BACKGROUND OF THE INVENTION

This invention relates to an optical disc drive and a method of controlling laser light power in the optical disk drive. In particular, this invention relates to gain control of a detector for detecting laser light to control the power of the laser light.

Optical disc drives have a variety of applications, for example, in motion picture players, motion picture recording players, and data storage devices for computers. CD (Compact Disc), DVD (Digital Versatile Disc), and BD (Blu-ray Disc) are known as the kinds of optical disc for storing data. The CD, DVD, and BD each have a disc type for read only and a disc type for read and write.

An optical disc drive irradiates an optical disc with laser light emitted from a laser light source and reads data recorded on the optical disc with the laser light reflected off the recording surface of the optical disc. An optical disc drive having a recording function irradiates the recording surface of an optical disc with laser light to change the state of the recording surface, which results in recording data onto the optical disc.

For accurate and stable recording and reading, the power of laser light (laser output power) should be controlled with accuracy. For this reason, an optical disc drive includes a system that automatically controls the laser light power. This is called APC (Automatic Power Control). The APC monitors the power (intensity) of the laser light from the laser light source and adjusts drive current supplied to the laser light source so that the laser light power falls within a desired range.

The power of laser light is required to be controlled accurately and stably for proper servo control as well. An optical disc drive positions a laser spot precisely at a target position (positioning control of laser spot) through servo control of a pickup (optical head). The servo control system in the optical disc drive performs tracking servo control, which is positioning control in the disc radial direction, and focusing servo control. Since the servo control system uses (the RF signal of) the reflection of laser light off the recording surface like in reading user data, accurate and stable control of the laser luminance power is required for accurate and stable servo control.

The APC receives a part of the light thrown by the laser light source to an optical disc at a photodiode element and converts the light signal into an electric signal. This electric signal is amplified by an amplifier and transferred to a controller. The circuit module (laser-light detector) including the photodiode element and the amplifier is called monitor diode in this description.

The laser light power thrown to the optical disc is different depending on the kind of optical disc and also depending on whether the laser light is for a preheating operation or for a recording/reading operation. Consequently, the laser light power received by the photodiode element varies depending on these circumstances. If the gain of (the amplifier of) the monitor diode is fixed, the output of the monitor diode considerably varies with considerable variation in the power of laser light. For this reason, APC that selects a different gain for the monitor diode depending on the kind of optical disc or whether the laser light is for a preheating operation or for a recording/reading operation (refer to JP 2004-146050 A).

SUMMARY OF THE INVENTION

As disclosed in JP 2004-146050 A, selecting the gain for the monitor diode depending on the kind of laser light power enables the percentage change in output (operation range) of the monitor diode to be a desired value, which achieves more accurate APC. In the meanwhile, for the optimum and more stable recording/reading operations, demanded is to still increase the accuracy in the control of laser light power.

The output signal of the monitor diode is transmitted to a monitoring part of a controller via a transmission path. In this transmission path, a noise may be superimposed on the output signal of the monitor diode. The level of the noise in the transmission path varies depending on the circuit configuration or use conditions; it may reach a few millivolts. In the case where the monitor diode output is small, the few-millivolt noise adversely affects the APC.

The laser light power from the laser light source is high when forming a mark in a recording operation. In contrast, the laser light power is low in a reading operation (including servo control) and in servo control for a recording operation (in irradiation of a space with laser light). Accordingly, the noise in the monitor diode output is a problem particularly in reading operations and in servo control for recording operations.

The variation in the output signal of the monitor diode caused by noise leads to variation in the laser light power from the laser light source; as a result, the RF signal varies. Consequently, the accuracy and stability in reading data and servo control might be degraded. An object of this invention is therefore more accurate and stable laser output power control to achieve stable reading and/or recording operations.

An aspect of the present invention is an optical disc drive comprising a laser light source for emitting laser light to an optical disc, a monitor photodetector for receiving the laser light emitted by the laser light source to control the laser light, a laser power controller for controlling power of the laser light source depending on output of the monitor photodetector, and a controller for measuring signal variations representing variations in the output of the monitor photodetector to control gain of the monitor photodetector based on results of the measurement.

An optical disc drive in an aspect of the present invention provides more accurate and stable power control of a laser light source.

The above and other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE EMBODIMENTS

Hereinafter, an embodiment of this invention will be described. For clarity of explanation, the following descriptions and the accompanying drawings contain omissions and simplifications as appropriate. Throughout the drawings, like components are denoted by like reference signs and their repetitive explanation is omitted for clarity of explanation, if not necessary.

This embodiment has a feature in control of the output power of a laser in an optical disc drive. In this embodiment, this control is referred to as APC (Automatic Power Control). The APC compensates for a change in luminous efficiency caused by a change in ambient temperature around the laser light source or degradation over time to control the laser light power so as to be accurate and stable.

An optical disc drive includes a monitor diode that receives laser light from a laser light source to monitor the luminance power (laser light power). The monitor diode is a photodetector that generates an electric signal corresponding to the laser light power from the laser light source (converts a light signal into an electric signal). The monitor diode sends the electric signal representing the detected laser light power to a laser light controller.

The laser light controller controls drive current to the laser light source based on the results of measurement at the monitor diode to obtain a desired laser light power (laser light intensity). The optical disc drive of this embodiment has a feature particularly in its gain control (sensitivity control) of the monitor diode. The gain control in this embodiment improves accuracy and stability in the APC to achieve stable recording and/or reading operations.

Figure 1:
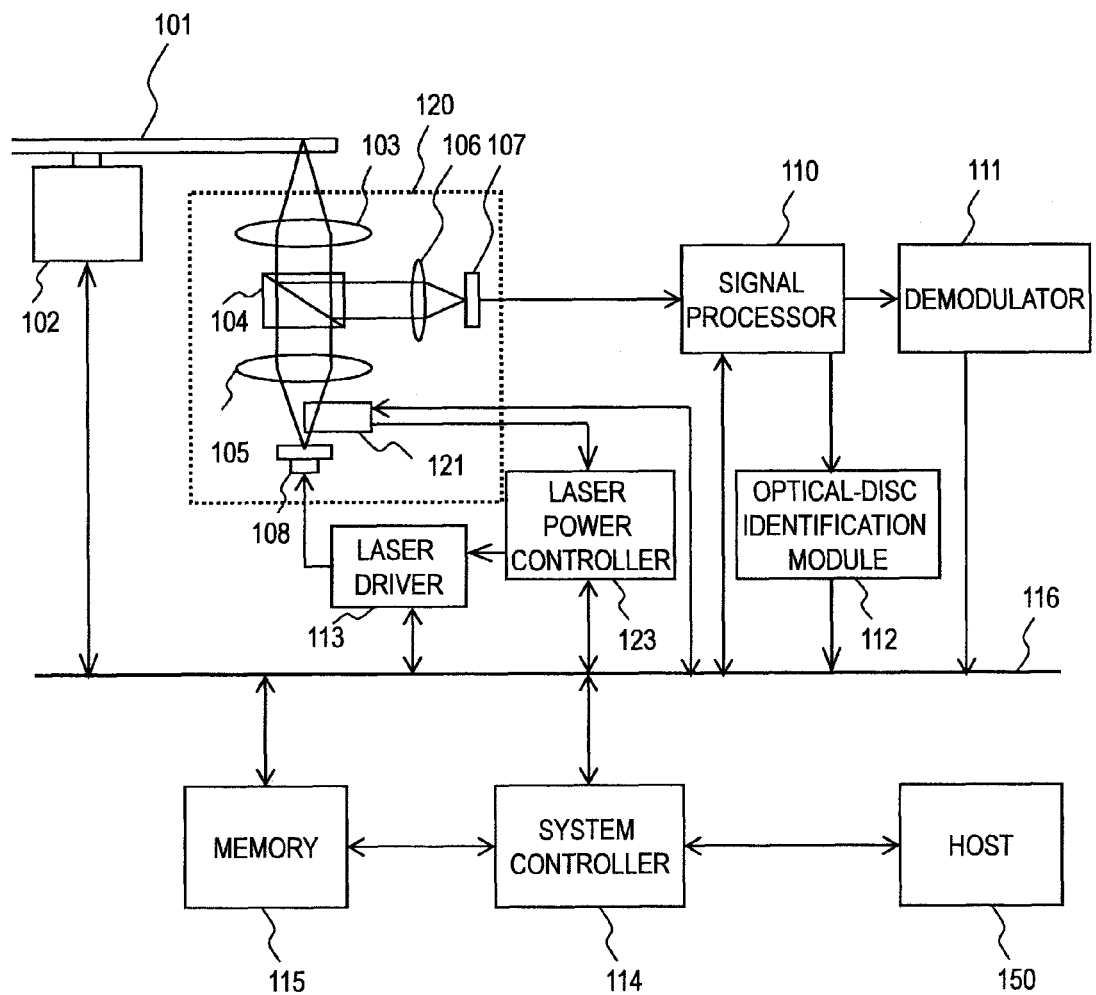
FIG. 1 is a block diagram schematically illustrating an overall configuration of an optical disc drive in an embodiment of this invention.

Before explaining the APC in this embodiment in detail, an overall configuration of an optical disc drive in this embodiment will be described with reference to the block diagram of FIG. 1. FIG. 1 is a block diagram schematically illustrating a configuration of an optical disc drive 100 in this embodiment. This optical disc drive 100 is connected to a host computer 150 and transfers data read from an optical disc 101 (for example, a Blu-ray Disc or BD) loaded therein to the host computer 150.

The optical disc drive 100 may have a function to record data received from the host computer 150 onto a writable optical disc 101 (for example, a BD-R). The APC in this embodiment may be used in both of reading operations and recording operations, but is particularly useful in reading operations.

The optical disc drive 100 includes a spindle motor 102, a signal processor 110, a demodulator 111, an optical-disc identification module 112, a laser driver 113, a system controller 114, a memory 115, a data bus 116, an optical pickup 120, and a laser power controller 123.

The spindle motor 102 rotates an optical disc 101 loaded in the optical disc drive 100. The optical pickup 120 includes an object lens 103, a beam splitter 104, a collimating lens 105, a focal lens 106, a photoelectric converter 107, a laser light source 108, and a monitor diode 121. When reading data from the optical disc 101, the optical pickup 120 irradiates the optical disc 101 with weak laser light, reads data recorded on the optical disc 101 using the reflection of the laser light, and outputs a signal corresponding to the reflection.

The laser light source 108 is typically a semiconductor laser that generates a predetermined intensity (power) of laser light for recording or reading. The laser light source 108 emits laser light having a wavelength specified for each type of disc to be loaded. The laser light emitted by the laser light source 108 passes through the collimating lens 105, the beam splitter 104, and the object lens 103, and impinges on a specified radial point of the recording surface of the optical disc 101. The object lens 103 is driven by an actuator in the optical pickup 120 and is adjusted so that laser light is focused on the optical disc surface.

In recording data onto the optical disc 101, the laser light source 108 irradiates the optical disc 101 with more intensive laser light than in reading data therefrom. On the recordable optical disc 101, the heat at the spot irradiated with the laser light changes the physical properties of the recording layer to form a recording pit. The reflectance of the recording layer is changed at the recording pit to record data.

The laser light reflected from the recording surface of the optical disc 101 is split by the beam splitter 104, collected by the focal lens 106, and directed to the photoelectric converter 107. The photoelectric converter 107 converts the received reflection into an electric signal and outputs the electric signal corresponding to the reflection. The signal processor 110 generates an RF signal from the signal outputted by the photoelectric converter 107.

The monitor diode 121 is a photodetector for monitoring laser light power and measures the power of the laser light (the intensity of the laser light) for APC. The monitor diode 121 includes a photodiode of a photoelectric conversion element and an amplifier that converts the output of the photodiode into voltage and amplifies it. In this embodiment, the gain (sensitivity) of the monitor diode 121 is variable and the system controller 114 controls its gain.

This embodiment has a feature in the gain control of the monitor diode 121. The details of this feature will be described later. The signal band of the monitor diode 121 may be sufficiently low compared with a high frequency signal which is superimposed on the laser light in reading operations. The monitor diode output signal detected by the monitor diode 121 is supplied to the laser power controller 123.

The signal processor 110 is a digital signal processor (DSP), which generates digital data of an RF signal from the output of the photoelectric converter 107. The signal processor 110 also generates an optical-disc identifier signal differing depending on the structure of the optical disc, a focus error signal for adjusting the focal point of a light beam, and a tracking error signal for following a track of the optical disc 101 from the output of the photoelectric converter 107 and outputs them.

The demodulator 111 demodulates the digital data received from the signal processor 110 in accordance with the method determined for each kind of optical disc. The demodulator 111 further performs error detection and error correction on the demodulated data, and then temporarily stores the data in the memory 115 (buffer).

The optical-disc identification module 112 identifies the kind of the loaded optical disc 101 with reference to the optical-disc identifier signal outputted from the signal processor 110. The result of identification of the optical disc 101 outputted from the optical-disc identification module 112 is sent to the system controller 114 via the data bus 116.

The system controller 114 controls the modules to make optimum conditions (recording conditions/reading conditions) for the identified optical disc based on the result of identification of the optical disc. The system controller 114 performs tracking servo control and focusing servo control using the error signals from the signal processor 110.

The laser driver 113 outputs a laser drive signal 117 for driving the laser light source 108 in the optical pickup 120. The laser driver 113 applies a laser drive signal (drive current) to the laser light source 108 under control of the laser power controller 123.

The laser power controller 123 performs APC. The laser power controller 123 controls drive current to the laser light source 108 through the laser driver 113 to control the output power of the laser light source 108. The laser power controller 123 includes a register, which holds target values of laser power for reading and recording (if the optical disc drive has a recording function). The laser power controller 123 controls the drive current to the laser light source 108 with reference to the target values and results of measurement at the monitor diode 121.

The system controller 114 includes a processor for controlling operations of the optical disc drive 100 and a memory. The system controller 114 may include a logic circuit to perform a specific process. The memory in the system controller 114 stores a program to be executed and data necessary for executing the program.

The system controller 114 further includes an interface for controlling sending and receiving data and commands between the optical disc drive 100 and the host computer 150 connected thereto. The system controller 114 controls reading of data temporarily stored in the memory 115 and writing of data to the memory 115. The system controller 114 interprets a command received from the host computer 150 and processes the received command.

The memory 115 includes a buffer area and temporarily stores data read from the optical disc 101 in the buffer area. The memory 115 further temporarily stores data transferred by the host computer 150. The data bus 116 interconnects the modules in the optical disc drive 100. Signals between modules are transmitted by the data bus 116. The configuration shown in FIG. 1 is an example of the module configuration of an optical disc drive; whether to implement each function by hardware or software depends on the design of the optical disc drive.

Figure 2:
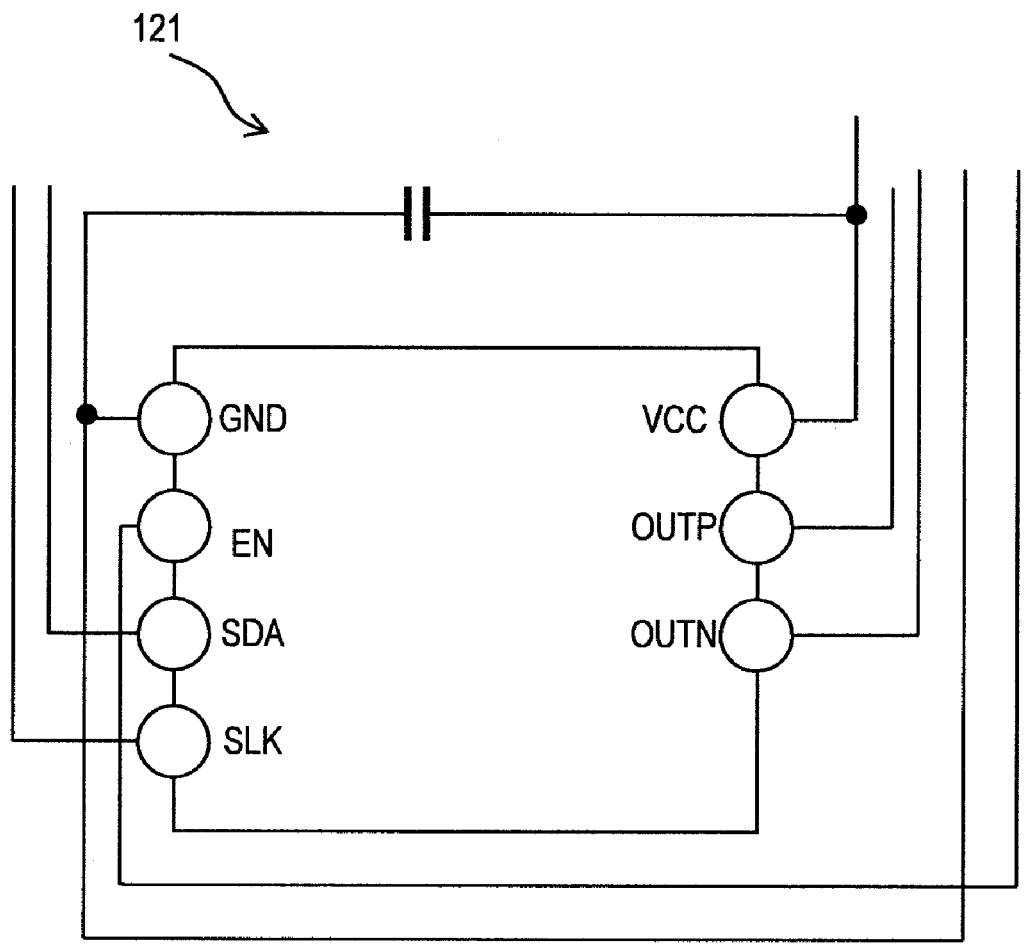
FIG. 2 is a diagram schematically illustrating a configuration of a monitor diode in the embodiment of this invention.

As described above, the optical disc drive 100 of this embodiment has a feature in its APC, and particularly in the gain control of the monitor diode 121. FIG. 2 is a peripheral schematic circuit diagram illustrating an example of the configuration of the monitor diode 121. In the example of FIG. 2, the monitor diode 121 has eight input and output terminals.

Specifically, the monitor diode 121 has a ground terminal GND, a power terminal VCC, monitor signal output terminals OUTP and OUTN, a serial data input terminal SDA, a clock terminal SLK, and an enable signal terminal EN.

The operating parameters of the monitor diode 121 are inputted from the serial data input terminal SDA in accordance with a clock signal from the clock terminal SLK. Particularly in this embodiment, the gain, or the sensitivity of the output, of (the amplifier in) the monitor diode 121 is settable. The system controller 114 sets a gain value to the monitor diode 121 through the serial data input terminal SDA. The system controller 114 controls whether to permit receiving at the serial data input terminal SDA with a signal to the enable signal terminal EN.

The monitor diode 121 outputs an electric signal (voltage signal) corresponding to the detected laser light power (intensity) from the output terminals OUTP and OUTN. Specifically, the monitor diode 121 converts received laser light into a voltage signal and amplifies it in accordance with the preset gain value. The amplified monitor signal is sent from the output terminals OUTP and OUTN to the laser power controller 123.

In this embodiment, the gain in the monitor diode 121 may be any parameter for the circuit modules in the monitor diode 121 as long as it defines the ratio of the output of electric signal to the input of laser light.

The laser power controller 123 internally holds a laser power target value. The laser power controller 123 compares the laser power target value with the output from the monitor diode 121 to calculate the difference value. The calculated difference value is supplied to the laser driver 113.

The laser driver 113 controls the intensity of laser light from the laser light source 108 with the difference value calculated by the laser power controller 123. The difference value represents the drive current to the laser power source 108; the laser driver 113 supplies this drive current to the laser power source 108 to obtain a desired laser light power. This operation compensates for a change in I/L ratio caused by change in ambient temperature around the laser light source 108, degradation over time, and the like to provide stable laser intensity under control.

The system controller 114 sets laser power target values to the laser power controller 123. The system controller 114 sets the laser power target values for reading operations and for recording operations (if the optical disc drive has a recording function) depending on the result of identification of the kind of optical disc by the optical-disc identification module 112.

Moreover, the system controller 114 in this embodiment refers to the gain value of the monitor diode 121 in determining the laser power target values. The intensity of the output signal from the monitor diode 121 responsive to the same intensity of laser light varies with the gain of the monitor diode 121. For this reason, the system controller 114 determines the target values depending on the gain of the monitor diode 121 in accordance with predetermined settings. In general, the greater the gain value, the greater the target values.

In place of the system controller 114, the laser power controller 123 may calculate the target values. For example, the laser power controller 123 obtains the value of the monitor diode gain from the system controller 114 and holds it. The laser power controller 123 determines the target values based on a result of identification by the optical-disc identification module 112 and the gain value, and holds the values.

The system controller 114 may determine the target values based on a result of identification by the optical-disc identification module 112 and alter the value obtained from the monitor diode 121 depending on the preset gain value. Alternatively, in calculating the difference between a target value and the output of the monitor diode, it may alter the both values depending on the gain value.

Hereinafter, determination of the gain for the monitor diode 121 will be described in detail. In the configuration described below, the system controller 114 performs this process. Any constituent may perform this process depending on the design of the optical disc drive. The system controller 114 measures output variations of the monitor diode 121 and determines the gain value for the monitor diode 121 based on the measurement.

Unlike temperature variation or variation over time, the output variation of the monitor diode 121 in a short time is supposed to be caused by noise. Namely, a noise is superimposed in the transmission path from the monitor diode 121 to the system controller 114, causing variations in the output value of the monitor diode obtained by the system controller 114.

The system controller 114 adjusts the gain of the monitor diode based on the measured amount of output variation (noise level). Specifically, it raises the gain with increase in the measured value of (the output variation caused by) the noise. This operation can reduce the effect of the noise to the monitor diode output to a desired level.

The system controller 114 measures variations in a signal representing the monitor diode output to measure the output variations of the monitor diode 121. The output signal of the monitor diode 121 directly indicates the output variation of the monitor diode 121. In addition to this, variation in the RF signal, which varies with monitor diode output, can represent the variation in monitor diode output caused by noise.

Figure 3:
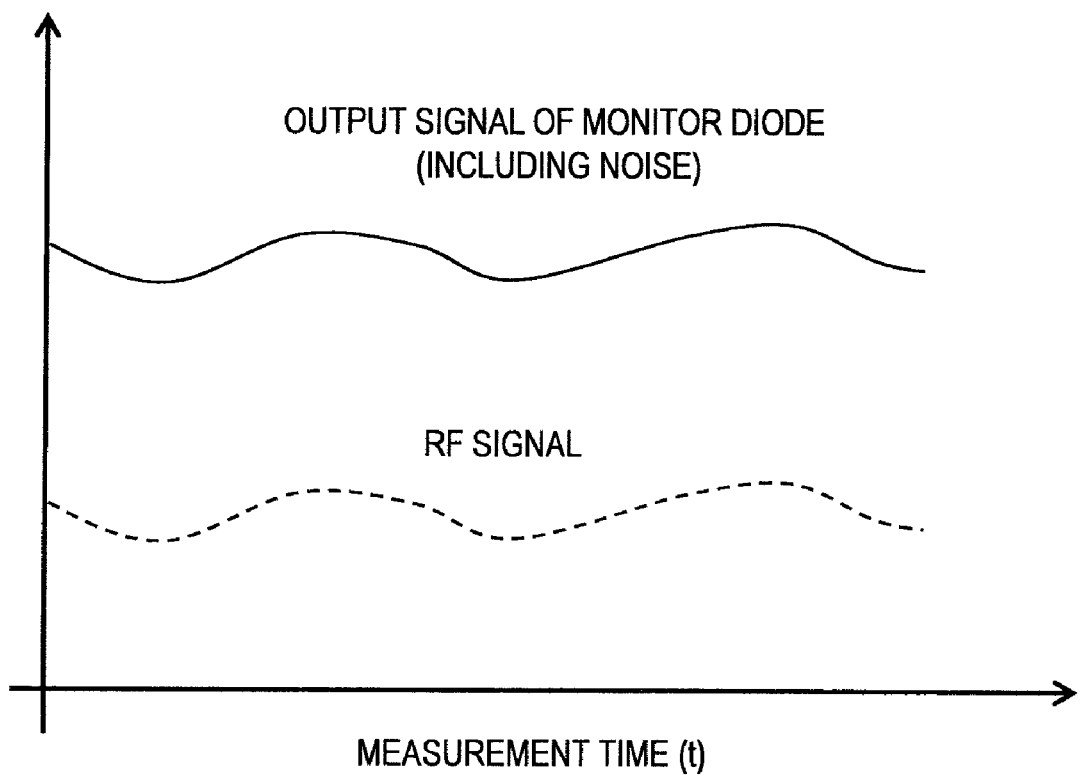
FIG. 3 is a drawing schematically illustrating the relationship between the monitor diode output varying by a noise and an RF signal in the embodiment of this invention.

FIG. 3 is a drawing schematically illustrating the relationship between a monitor diode output and an RF signal. The RF signal is a detection signal of laser light reflected from the optical disc 101; it varies with the power of the laser light from the laser light source 108. Since the APC changes the laser power depending on the output of the monitor diode 121, variation in monitor diode output caused by noise varies the laser power, resulting in variation in the RF signal. The variation in the RF signal indicates the variation in the monitor diode output.

Accordingly, the system controller 114 can measure output variations of the monitor diode 121 directly or indirectly. The direct measurement of output variations of the monitor diode 121 refers to the output values of the monitor diode 121 to measure the variations. The system controller 114 can also measure the output variations of the monitor diode 121 indirectly by measuring variations in the RF signal.

Figure 4:
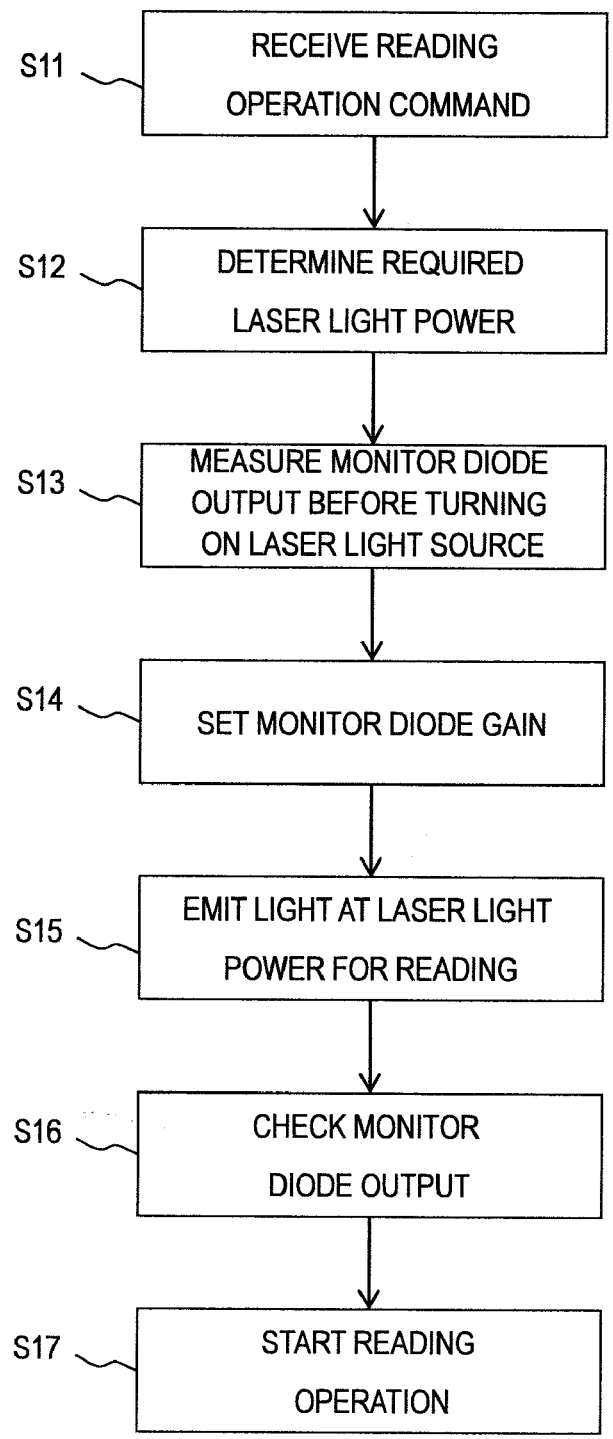
FIG. 4 is a flowchart illustrating a process of gain control for the monitor diode in the embodiment of this invention.

First, a preferable example of direct measurement of variations in monitor diode output by monitoring the output signal of the monitor diode 121 will be described with reference to the flowchart of FIG. 4. This process determines the gain of the monitor diode 121 for a reading operation.

When the system controller 114 receives a reading operation command from the host computer 150 (S11), it determines the required laser light power (S12). As described above, the laser light power for reading differs depending on the kind of optical disc. The system controller 114 obtains the laser power value in accordance with the determination by the optical-disc identification module 112.

Before turning on the laser light source 108, the system controller 114 monitors the output signal of the monitor diode 121 and measures the variations (S13). Since the laser driver 113 does not supply power and the laser light source 108 does not emit light, values of the monitor diode output higher than the zero level (reference level) are caused by a noise in the transmission path. In other words, the values of the monitor diode output indicate the amount of variation.

The system controller 114 monitors the monitor diode output for a specific time period to measure the amount of variation. The system controller 114 may use a time period having a certain length preset to the optical disc drive 100 as the specific time period or may change the length of the time period at every measurement in accordance with a preset rule.

The amount of variation can be measured in some ways. For example, the system controller 114 may use the highest value in a measurement time as the measured value of the amount of output variation. Alternatively, it may determine a threshold from the output values measured in the measurement period and use the highest value in the range below the threshold as the amount of output variation.

The system controller 114 determines the gain value of the monitor diode 121 based on the result of measurement of the amount of variation in the monitor diode output signal and sets the value to the register in the monitor diode 121 (S14). In a preferred configuration, the system controller 114 determines the gain value from the laser light power determined at the step S12 and the measured amount of output variation. Since the monitor diode output depends on the laser light power and the gain, this configuration can effectively suppress the effect of the noise to the monitor diode output.

Preferably, the system controller 114 determines the gain value of the monitor diode 121 so that the ratio of the value of monitor diode output by laser light to the measured value of noise will fall within a specified range (for example, to be more than a specific value). For example, it is assumed that the laser light power is denoted by P [mW], the measured noise by N [mV], the gain value by G, and the foregoing specific value is 10.

The gain value G is set at N*10/P or more (for example, N*10/P). In this way, the gain can be obtained by an appropriate and simple calculation that multiplies the amount of output variation (N) by a defined coefficient (for example, 10/P). The method of calculating the gain value may be selected appropriately in accordance with the design of the optical disc drive.

Subsequently, the system controller 114 emits laser light at the power for reading to the optical disc 101 (S15). Specifically, the system controller 114 sets a target value to the laser power controller 123 and requests emission of laser light. The laser power controller 123 supplies the laser light source 108 with a specific power through the laser driver 113 for the laser light source 108 to emit laser light.

The laser power controller 123 controls the laser light power (the drive signal to the laser light source 108) in accordance with the output signal from the monitor diode 121 so that the laser light power will be a desired value (S16). The system controller 114 carries out the reading operation of the data in the intended area with the laser light applied to the optical disc 101 (S17).

Figure 5:
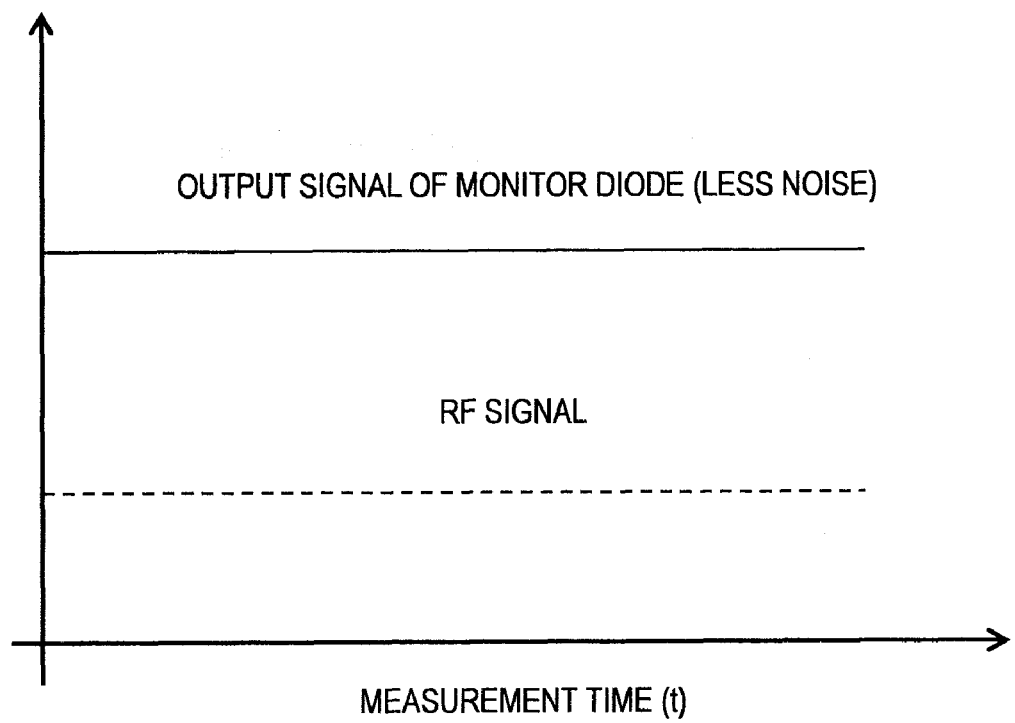
FIG. 5 is a drawing schematically illustrating the relationship between the monitor diode output with effect of noise reduced and the RF signal in the embodiment of this invention.

FIG. 5 schematically illustrates the monitor diode output after gain adjustment and the RF signal. Since the monitor diode gain has been appropriately adjusted based on the result of measurement of noise, the respective variations caused by the noise have been effectively suppressed. Such determination of the gain of the monitor diode 121 depending on its output variation reduces the effect of noise in the APC, achieving more accurate and stable reading. Since this configuration monitors the output of the monitor diode 121, (the amount of variation caused by) the noise in the output can be measured directly to attain more accurate measurement of the noise.

The above-described configuration adjusts the gain at every receipt of a reading operation command; accordingly, an appropriate gain can be determined for every reading operation. Unlike this, or in addition to this, the system controller 114 may adjust the gain at every initialization upon loading an optical disc to the optical disc drive 100. The method of measuring noise responsive to a reading operation command may be different from that at initialization. For example, these methods may employ different measurement times. The same applies to the configuration described hereinafter.

Figure 6:
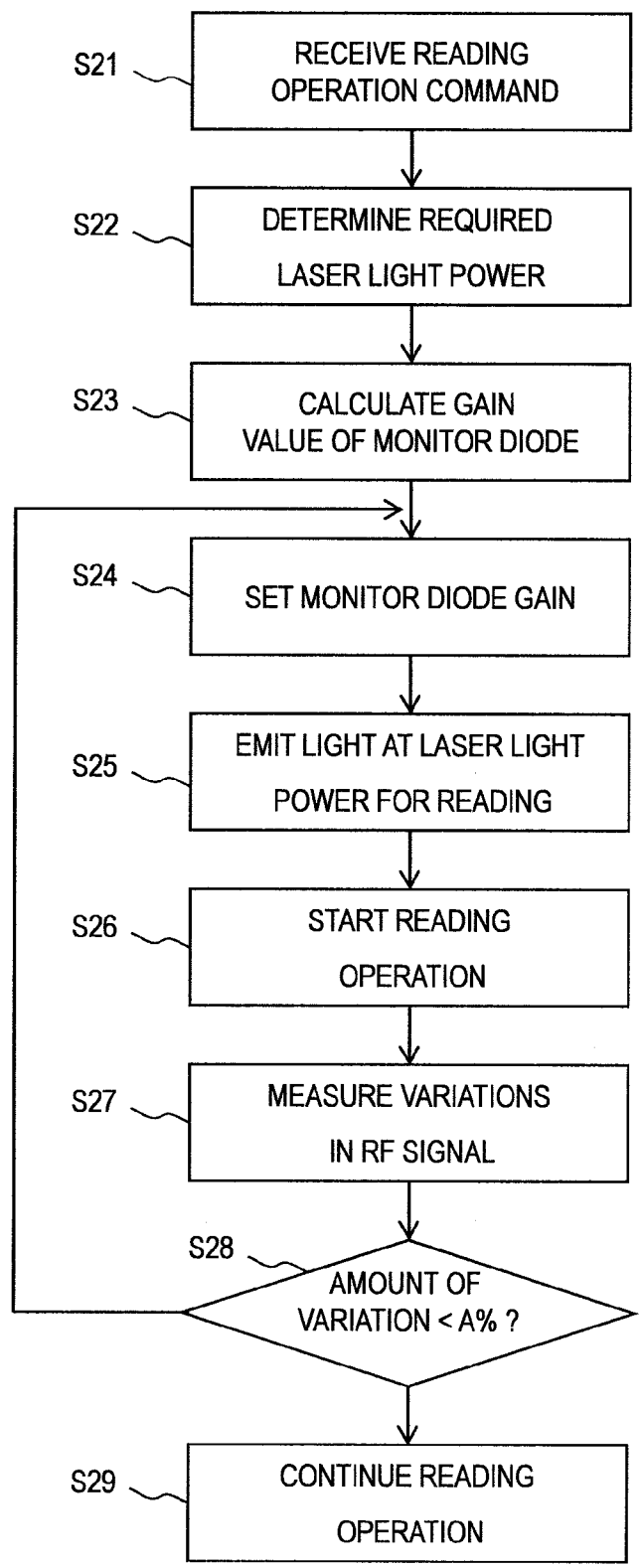
FIG. 6 is a flowchart illustrating another process of gain control for the monitor diode in the embodiment of this invention.

Now, adjustment of the monitor diode gain with measurement of variations in the RF signal that represent variations in the monitor diode output will be described. The flowchart of FIG. 6 illustrates a preferable example of gain adjustment for a reading operation.

When the system controller 114 receives a reading operation command from the host computer 150 (S21), it determines a required power of laser light (S22). The system controller 114 calculates a monitor diode gain value from the required laser light power determined at the step S22 (S23). It sets the calculated value to the register in the monitor diode 121 (S24). This value is the initial value of the monitor diode gain.

Subsequently, the laser light source 108 emits laser light at the power for reading (S25) and the system controller 114 starts a reading operation (S26). The data to be read by a reading operation may be the data at the address designated by the reading operation command or the data in a specific area. Laser light from the laser light source 108 impinges on an optical disc 101. The reflection therefrom is converted to an electric signal (current) by the photoelectric converter 107. The signal processor 110 generates an RF signal from the electric signal received from the photoelectric converter 107.

The system controller 114 obtains the RF signal from the signal processor 110 and measures the variations (S27). The measurement time is the same as in the process described with reference to FIG. 4. The amount of variation can be defined as the difference between the lowest value and the highest value of the RF signal. The highest value and the lowest value in the measurement may be determined in accordance with the method selected by the design. For example, the system controller 114 obtains the highest value and the lowest value in a range which is defined using thresholds determined from the result of measurement and calculates the amount of variation from them. Alternatively, it may use the highest value and the lowest value in the measurement as they are.

The expression of the amount of variation is not particularly limited. The amount of variation may be calculated using the values of the RF signal obtained in voltage. Alternatively, the amount of variation may be expressed by the ratio of the difference between the highest value and the lowest value of the RF signal to the calculated average value of the RF signal. Hereinafter, an example of determination of an appropriate monitor diode gain will be described that uses this ratio.

Next, the system controller 114 compares the amount of variation determined at the step S27 with a threshold A [%] (S28). In the case where the amount of variation is the threshold A or more, the system controller 114 sets a new gain value to the monitor diode 121 (S24). Since the amount of variation is large, it sets a gain value higher than the one that has been set. The system controller 114 repeats the steps S25 to S28 at the new gain value.

In the case where the amount of variation is less than the threshold A at the step S28, the monitor diode gain is determined at the value currently set. The optical disc drive 100 continues the reading operation in accordance with the reading operation command while performing the APC with the monitor diode 121 under the current setting (S29).

This configuration measures variations in the RF signal and adjusts the monitor diode gain based on the result of measurement. The gain value is determined so that the amount of variation in RF signal will fall within a specified range. Reading and servo control are performed based on the RF signal. In the above-described example, the amount of variation is expressed by the ratio of the difference to the average and the specified range is the values less than A. Measuring noise in the monitor diode output by the RF signal and adjusting the gain based on the result of measurement achieve effective reading and stable servo control.

The above configuration monitors the RF signal, but instead of this, it may monitor the monitor diode output. Like the RF signal, the monitor diode output varies with respect to the average value of the reference value. Measuring the monitor diode output with laser light irradiation can provide measurement under the conditions in actual reading operations. For more accurate measurement of noise, however, it is preferable to measure the noise without laser output from the laser light source 108, as described with reference to FIG. 4.

Although the methods of controlling the monitor diode gain for a reading operation have been described with reference to FIGS. 4 and 6, the monitor diode gain for a recording operation can also be set by these methods of this embodiment.

As set forth above, preferred embodiment of this invention has been described, but this invention is not limited to the above-described embodiment. Those skilled in the art can easily modify, add, omit or convert each component in the above-described embodiment within the scope of this invention.

What is claimed is:

1. An optical disc drive comprising:
   a laser light source for emitting laser light to an optical disc;
   a monitor photodetector for receiving the laser light emitted by the laser light source to control the laser light;
   a laser power controller for controlling power of the laser light source depending on output of the monitor photodetector; and
   a controller for measuring signal variations representing variations in the output of the monitor photodetector to control gain of the monitor photodetector based on results of the measurement.

2. The optical disc drive according to claim 1, wherein the signal variations are the variations in the output of the monitor photodetector.

3. The optical disc drive according to claim 1, wherein the monitor photodetector receives no laser light emitted by the laser light source in the measurement.

4. The optical disc drive according to claim 1, wherein the controller multiplies an amount of variation in the output of the monitor photodetector by a coefficient to obtain a value of the gain.

5. The optical disc drive according to claim 1, wherein the controller calculates the value of the gain for a reading operation based on a laser light power for the reading operation or a result of the measurement.

6. The optical disc drive according to claim 1, wherein the signal variations are variations in an electric signal generated from laser light emitted by the laser light source and reflected off the optical disc.

7. The optical disc drive according to claim 6, wherein the controller determines the value of the gain so that an amount of variation in the electric signal falls within a specified range.

8. A method of controlling power of laser light in an optical disc drive in which a laser light source emits the laser light onto an optical disc, comprising:
   measuring signal variations representing variations in output of a monitor photodetector;
   setting a gain of the monitor photodetector based on results of the measurement;
   receiving laser light from the optical disc at the monitor photodetector and converting the received laser light into an electric signal at the set gain; and
   controlling the laser light source depending on the electric signal from the monitor photodetector.

9. The method according to claim 8, wherein the measurement monitors the output of the monitor photodetector and measures variations in the output.

10. The method according to claim 8, wherein the monitor photodetector receives no laser light emitted by the laser light source in the measurement.

11. The method according to claim 8, wherein an amount of variation in the output of the monitor photodetector is multiplied by a coefficient to obtain a value of the gain.

12. The method according to claim 8, wherein the value of the gain for a reading operation is calculated based on a laser light power for the reading operation or a result of the measurement.

13. The method according to claim 8, wherein the signal variations are variations in an electric signal generated from the laser light emitted by the laser light source and reflected off the optical disc.

14. The method according to claim 13, wherein the value of the gain is determined so that an amount of variation in the electric signal falls within a specified range.

* * * * *